(12) United States Patent
Shemi et al.

(10) Patent No.: US 7,668,414 B2
(45) Date of Patent: Feb. 23, 2010

(54) SYSTEM AND METHOD FOR THE FABRICATION OF AN ELECTRO-OPTICAL MODULE

(75) Inventors: Amotz Shemi, Herzliya (IL); Yacov Malinovich, Tivon (IL); Eli Arad, Petach Tikva (IL)

(73) Assignee: Colorchip (Israel) Ltd, Caesarea (IL)

( * ) Notice: Subject to any disclaimer, the term of this patent is extended or adjusted under 35 U.S.C. 154(b) by 0 days.

(21) Appl. No.: 10/590,053

(22) PCT Filed: Feb. 20, 2005 (Under 37 CFR 1.47)

(86) PCT No.: PCT/IL2005/000208

§ 371 (c)(1),
(2), (4) Date: Apr. 2, 2008

(87) PCT Pub. No.: WO2006/067778

PCT Pub. Date: Jun. 29, 2006

(65) Prior Publication Data

US 2009/0016670 A1    Jan. 15, 2009

Related U.S. Application Data

(60) Provisional application No. 60/545,171, filed on Feb. 18, 2004, provisional application No. 60/545,496, filed on Feb. 19, 2004.

(51) Int. Cl.
G02B 6/12 (2006.01)
(52) U.S. Cl. ............................. 385/14; 385/88; 65/386; 398/142

(58) Field of Classification Search ................. 385/14, 385/88–89; 65/386; 398/142
See application file for complete search history.

(56) References Cited

U.S. PATENT DOCUMENTS

| 4,750,799 | A | 6/1988 | Kawachi et al. |
| 4,945,400 | A | 7/1990 | Blonder et al. |
| 5,835,646 | A * | 11/1998 | Yoshimura et al. ............ 385/14 |
| 6,257,771 | B1 * | 7/2001 | Okayasu ..................... 385/89 |
| 6,611,635 | B1 | 8/2003 | Yoshimura et al. |
| 6,934,313 | B1 * | 8/2005 | Deacon ....................... 372/64 |
| 2003/0024274 | A1 | 2/2003 | Cho et al. |

OTHER PUBLICATIONS

International Search Report PCT/IL2005/000208, filed Feb. 20, 2005 and mailed Nov. 2, 2005.

* cited by examiner

*Primary Examiner*—Ellen Kim
(74) *Attorney, Agent, or Firm*—Eitan Mehulal Law Group

(57) ABSTRACT

A system and method for fabricating an electro-optical hybrid module (100). The electro-optical hybrid module (100) may comprise an electro-optical component, an electronic component (110), a planar light wave circuit (PLC) embedded with at least an optical waveguide (120). The electro-optical component may transmit or receive energy through a microfolding mirror (160) while the electronic component may amplify and transfer an electric signal to the electro-optical component. The planar light wave circuit may typically provide an opto-electronic signal communication path via the plurality of optical waveguides that may be embedded in the planar light wave circuit.

16 Claims, 4 Drawing Sheets

US 7,668,414 B2

SYSTEM AND METHOD FOR THE FABRICATION OF AN ELECTRO-OPTICAL MODULE

CROSS-REFERENCE TO RELATED APPLICATIONS

This application is a National Phase Application of PCT International Application No. PCT/IL2005/000208, International Filing Date Feb. 20, 2005, claiming priority of US Provisional Patent Applications, 60/545,171, filed Feb. 18, 2004 and 60/545,496, filed Feb. 19, 2004, the entire disclosures of all of which are incorporated herein by reference.

BACKGROUND OF THE INVENTION

Optical communication systems may be configured to allow for the propagation of signals between desirable locations. The signals may propagate, through portions of the communication system, along an optical path. An opto-electronic module may typically be used in such optical communication systems such as for example a fiber optic communication system. The opto-electronic module may typically be used for transferring electrical energy and signals to light energy and signals or vice versa. This opto-electronic module may combine optical elements, electrical components, an optical waveguide, and an electrical circuit in order to implement the desired energy transferring capabilities.

Optical fiber may typically be used to guide optical signals in optical communication systems such as for example wavelength division multiplexing (WDM) optical communication systems. There exists a technological limitation in manufacturing a multi-path optical fiber for guiding several optical signals. Currently, a planar light waveguide circuit (PLC) combines several optical units with optical waveguides to be used as part of an optical communication system such as for example WDM. In communication systems incorporating PLC, active devices and optical waveguides may exist as separate entities.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
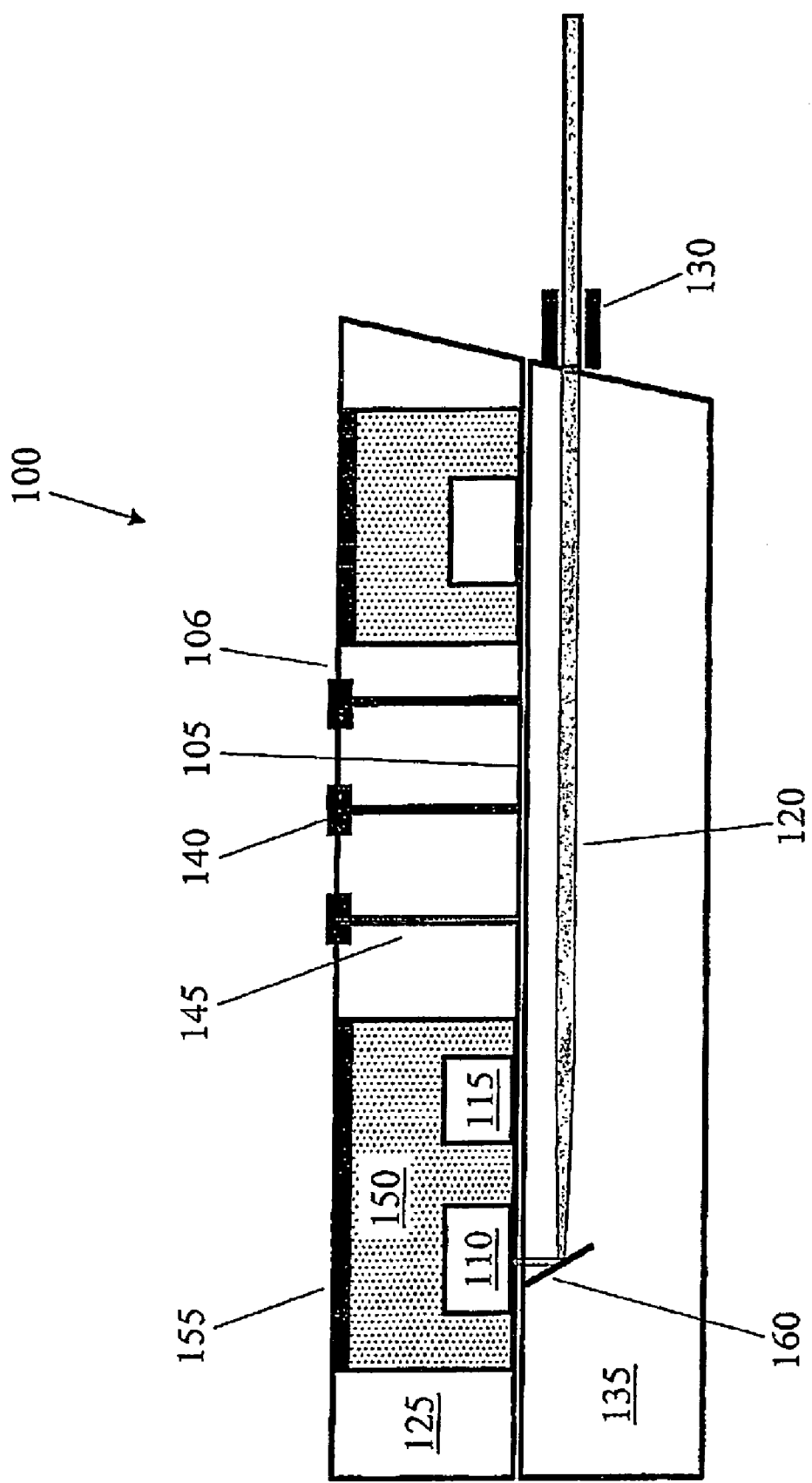
FIG. 1 is a is a schematic illustration of a side-view cross section of an opto-electric hybrid module according to some embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

It may be desirable to use a transparent substrate, such as for example glass, both for embedding a waveguide and for serving as a support substrate for several electro-optical components and for electrical conduits. The electro-optical components may include for example an optical diode, photodiode, laser diode, or similar components. Such transparent substrate may provide for direct optical coupling between the waveguide and the electro-optical components. Reference is made to FIG. 1. A fiber optic communication system may typically include an opto-electric hybrid module 100 that may typically be mounted onto a printed circuit board (PCB) 105, 106. An embodiment of the opto-electric hybrid module 100 may include an electro-optical component 110, an electronic component 115, at least an embedded waveguide 120, an optically transparent support such as for example glass support 125, and an optical fiber plug 130. The electro-optical component 110 may serve as a transmitter or receiver. The electronic component 115 may typically amplify and transfer an electric signal to an external component such as for example an electro-optical component 110. A planar lightwave circuit (PLC) 135 may be implemented using several waveguide manufacturing technologies such as for example a technique used to create ion exchange in glass substrate to create waveguides 120, or other similar techniques that may provide an optoelectronic signal communication path embedded within a substrate 135. A printed circuit board may be included on several of a plurality of surfaces included in the opto-electric hybrid module 100, 200 such as for example on an outer surface 106 or an inner surface 105. Waveguides 120 may be single mode or multimode waveguides for propagating an optoelectronic signal communication such as for example a light beam along the substrate 135. The optical waveguide may include optical functions such as for example optical power splitting, wavelength multiplexing, and wavelength demultiplexing. The waveguide may be tapered to improve the connection between the electro-optical component 110 and the waveguide 120. The glass support 135 may typically encapsule the waveguide 120. The opto-electric hybrid module 100, 200 may also include an optical fiber plug 130 for direct and easy connection to an external optical fiber. In another embodiment, the external optical fiber may be permanently connected to the optical input or output of the opto-electric hybrid module 100, 200 through bonding or similar methods for permanent optical connection.

The electronic component 115 may channel electrical energy to and from the electro-optical component 110. The electro-optical component 110 may be for example a photo diode, a laser diode, or similar component. An electrical interconnection such as for example bus structures (not shown), contacts to the PCB 140, and conducting vias 145 may typically be located on the surface of the waveguide support glass 135. Such electrical interconnects may be in the form of co-planar or strip-line conductors to allow for improved RF performance. Shortened conducting lines may further improve RF performance. The electrical interconnection may provide electrical power to the electronic component 115. The electro-optical 110 and electronic 115 components may be enclosed in a heat sink encapsulation 150 with a metal cap 155.

Figure 2:
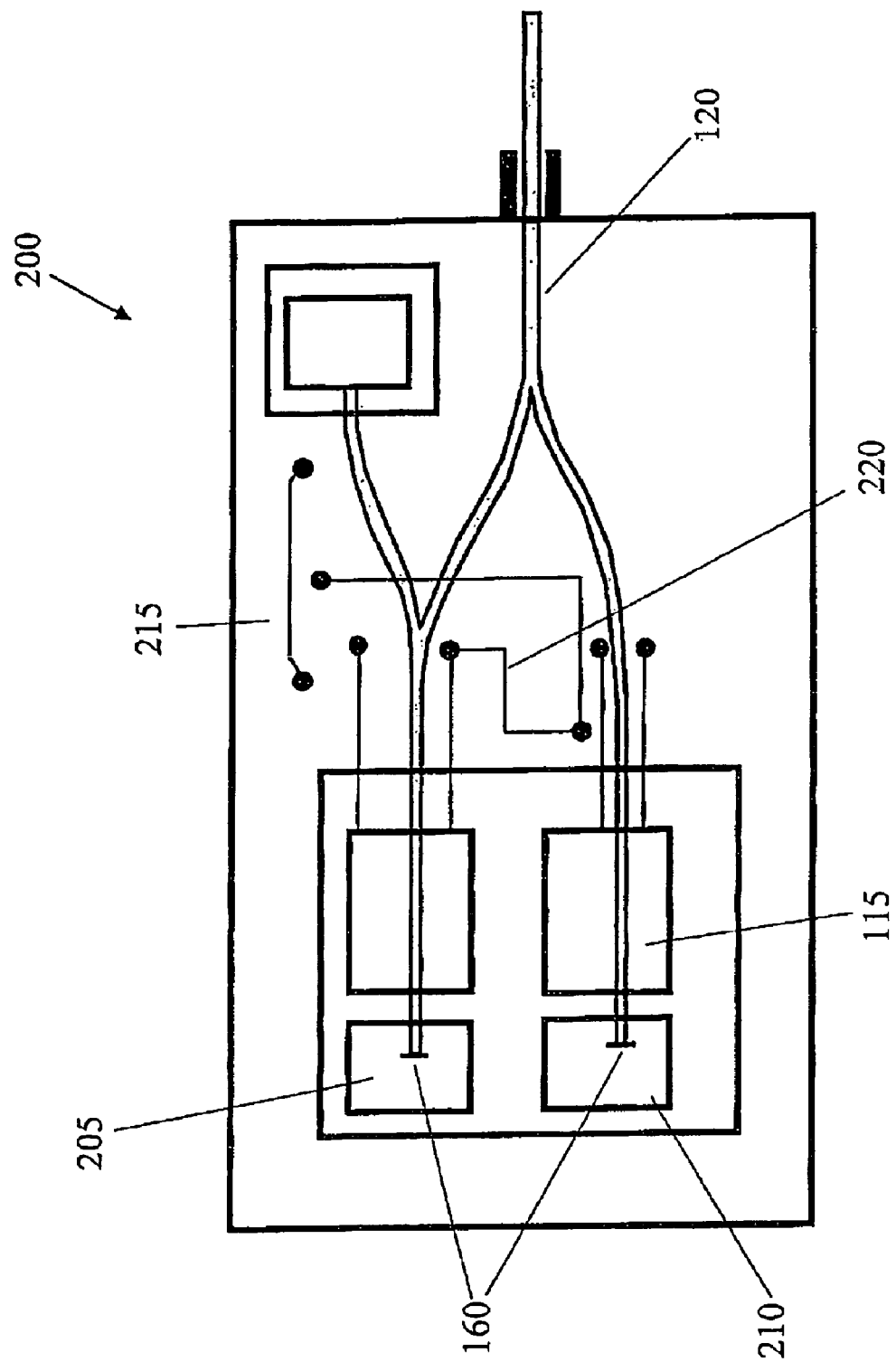
FIG. 2 is a schematic illustration of a top view of an opto-electric hybrid module according to some embodiments of the present invention.

Further reference is made to FIG. 2. According to a preferred embodiment of the present invention the electro-optical components 110 (FIG. 1) may include for example a laser diode 205, photodiode 210, semiconductor device (not shown) or similar electro-optical component. The photodiode 210, for example, may be coupled to the electronic component 115 and attached to the waveguide 120 channel through an embedded folding micro-mirror 160. The laser diode 205, for example, may also be attached to the waveguide 120 channel through another embedded folding micro-mirror 160. The folding micro-mirror 160 may be strategically positioned so as to direct energy transfer between the electro-optical component 110, such as for example the laser diode 205, and the waveguide 120. The micro-mirror 160 may be for example a groove in the glass that implements the Total Internal Reflection (TIR) Phenomenon or a metal-coated surface that reflects light, or the like. The laser diode 205 for example, may typically transmit optical energy into the waveguide 120 through the folding micro-mirror 160 while the photodiode 210, for example, may receive optical energy from the waveguide 120 through the folding micro-mirror 160. The laser diode 205 may receive electrical energy from the electrical interface 215 and convert the electrical energy into optical energy. The photo detector such as for example a photodiode 210 may receive optical energy from the waveguide 120 and convert the optical energy into an electrical signal. The electrical signal may be received and then transmitted by the electrical interface 215 to at least another electrical circuit 105, 106 that may be located on several surfaces comprising the opto-electric hybrid module 100, 200. The electrical circuits may include electrical components such as for example digital or analog amplifiers. The electrical components may be embedded within the opts electric hybrid module 100, 200.

The waveguide glass support 135 may typically include a plurality of ion-exchange waveguides 120 or any similar embedded waveguides, electrical circuits 215 and interconnects, and a plurality of beam folders such as for example the folding micro-mirror 160. The electro-optical component 110 may typically be a separate entity. Since the two separate entities, the electro-optical component 110 and waveguide glass support 135, may mechanically be tightly secured together their positioning for packaging may be relatively easy and the bonding accuracy may typically lead to the improvement of the overall optical performance. The waveguide glass support 135 and the electro-optical component 110 may typically be attached or bonded with an adhesive substance. The adhesive substance may typically be of light transmitting characteristics similar to those of the material of support 135, thereby assuring the existence of a well matched optical path between electro-optical component 110 and waveguide 120 while minimizing and even fully eliminating the existence of free-space gaps in that path. The emission or admission of optical energy by the electro-optical component 110 remains unaffected since free space or a change in impedance may be non-existent along the optical path. Thus, complicated optical matching considerations such as lenses and mechanical securing considerations to ensure steady and uniform positioning of electro-optical component 110 relative to waveguide 120 may be omitted. The adhesive mounting of the electro-optical component 110 onto the waveguide 120 may be known as bare chip mounting.

Bare chip mounting may typically allow for the development of a more compact, lightweight, optically accurate and mechanically durable electro-optical hybrid module 100, 200 design than would be possible with a package mounting.

A further use of the opto-electric hybrid module 100, 200 may allow for electrical and optical coupling between one or more integrated circuits, opto-electric hybrid modules 100, 200, or electro-optical components and a printed circuit board (PCB) 105, 106, may include a plurality of waveguide structures in addition to electrical connections. Such an opto-electric hybrid module 100, 200 may include an optical element flip-chip mounted on a substrate 135, an optical waveguide 120 formed in the substrate 135 and optically connected to the opto-electric component 110, and adhesives that may typically fill the gap between the substrate 135 and opto-electric component 110. The opto-electric component 110 may be flip-chip bonded to an integrated circuit using solder bump technology while the integrated circuit may be flip-chip bonded to a Ball Grid Array (BGA) package. The BGA package may be bonded to the PCB 135 using for example solder reflow technology. The opto-electric component 110 may have an attached lens to facilitate optical coupling to the optical waveguide 120.

According to a preferred embodiment of the invention, the electronic components 115 may be additionally mounted onto the surface of the optical waveguide 120. The electro-optical component 110 and the electronic components 115 may be completely sealed with a resin. Since the electro-optical 110 and electronic 115 components are mounted on the surface of the optical waveguide glass support 135, the interconnection between the elements may be shortened. The interconnection may be of a single layer, thereby facilitating the formation of the interconnection. The electro-optical hybrid module 100, 200 may be strengthened due to the resin seal (not shown) of the electro-optical 110 and electronic 115 components. Moreover, the electro-optical module 100, 200 may improve its degree of integration by having a hybrid combination of opto-electric 110 and electronic 115 components while simultaneously reducing cost.

Furthermore, the resin may have light blocking characteristics. The electronic element 115 may undergo faulty operation in the event that light impinges upon it. Therefore, faulty electronic operation relating to impingement of light may be prevented by sealing the electronic element 115 with such a resin. The electronic element 115 may have the ability to drive the electro-optical component 110 such as for example the photodiode 210. This may lead to a greater degree of integration for the optical module 100, 200. Due to the dual mounting of the electro-optical component 110 and the electronic element 115 that may drive or control the electro-optical component 110, the opto-electric hybrid module 100, 200 may be of increased value such as for example an increased usage of space while achieving a lowered cost.

According to an embodiment of the present invention, a circuit 220 may be directly laminated on the glass surface of the waveguide substrate 135, thereby eliminating the need for a mounted electronic element 115. There may be no need to consider the reliability of the connection between different components. The connection between integrated circuit components may be eliminated, thereby improving the interconnection impedance and noise characteristics while minimizing time delays. This embodiment of the invention may further lead to a higher degree of integration on the opto-electric hybrid module 100, 200 while achieving/maintaining minimal costs.

Figure 3:
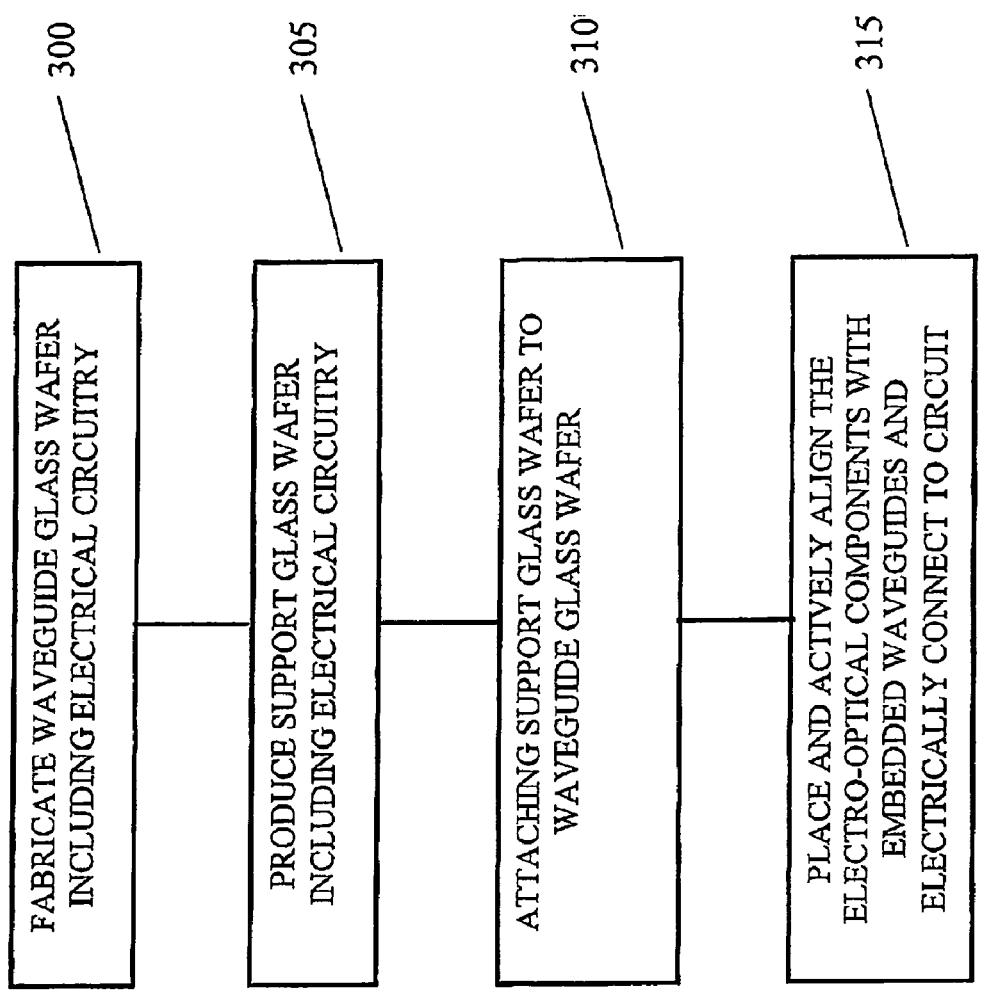
FIG. 3 depicts a flowchart illustrating a method for manufacturing an opto-electric hybrid module according to some embodiments of the present invention.
Figure 4:
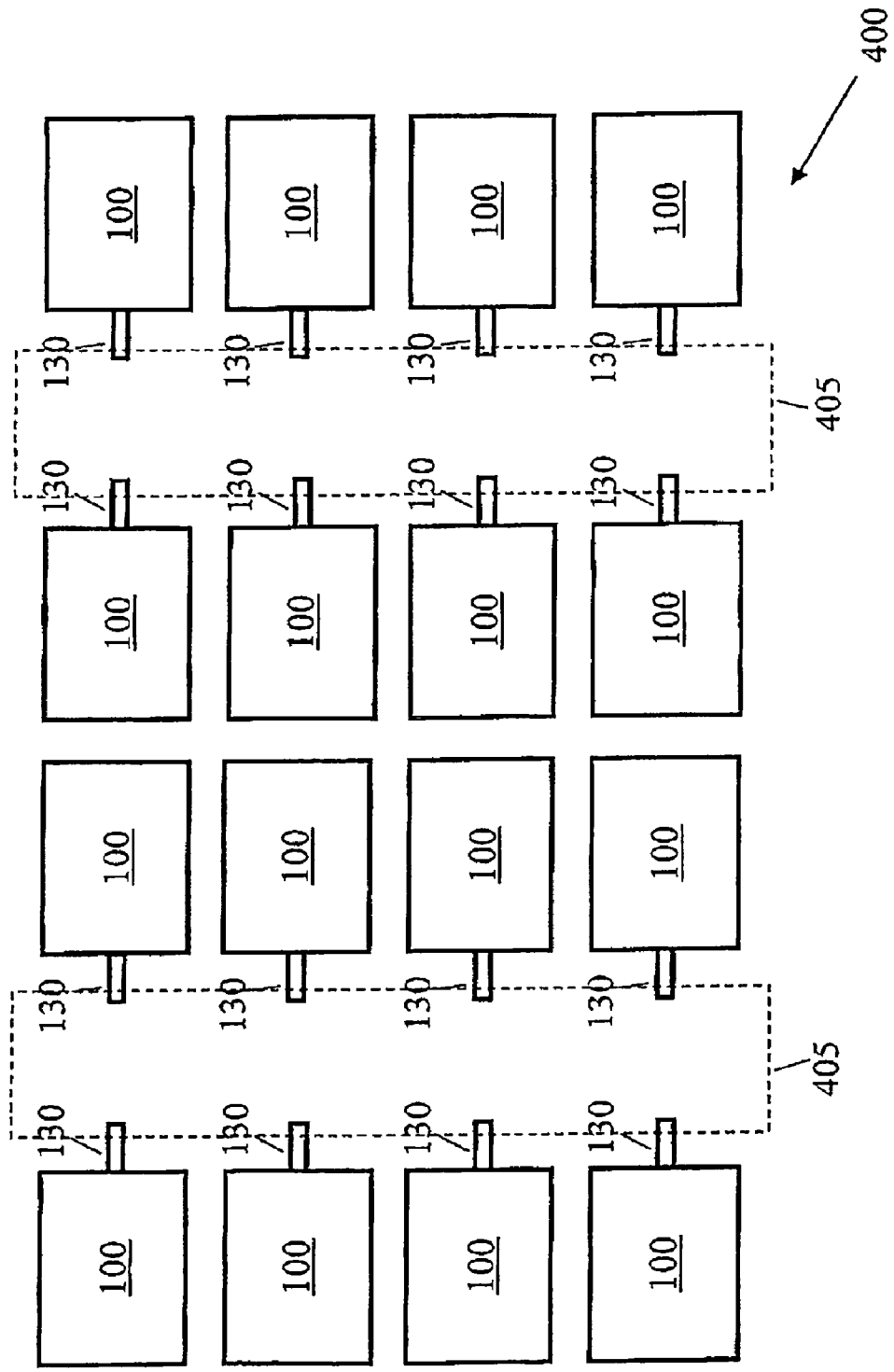
FIG. 4 is a schematic illustration of a partial wafer map of a plurality of opto-electric modules according to some embodiments of the present invention.

A method as shown in FIG. 3, for manufacturing an opto-electric hybrid module 100,200 according to some embodiments of the invention may include fabricating the waveguide glass wafer including electrical circuitry 105, 106 (block 300). Fabricating the waveguide glass wafer may comprise creating waveguides 120 using ion exchange technology in a Planar Lightwave Circuit (PLC) glass layer 135, printing electric lines 105 and contacts on the PLC glass layer 135, dicing a slot for example at 45 degrees, and coating the slot with a metal according to some embodiments. A support glass wafer 125 may be produced by dicing cavities for the inclusion of opto-electrical 110 and electronic 115 components in them, creating vias 145, coating the vias with conductive material, and printing electrical lines and contacts on both sides of the wafer (block 305). The vias 145 may be created through various etching techniques such as for example dry or wet etch The support glass wafer 125 may then be attached to the waveguide (PLC) glass wafer 135 thereby creating an opto-electric module 100, 200 (block 310). Reference is made to FIG. 4, which depicts a partial wafer map 400 of a plurality of opto-electric modules 100, 200 upon double bar dicing 405. The wafer may be diced at the fiber optic connector side 130 in order to create double bars 405 that expose the fiber optic endpoints 130 of the plurality of opto-electric modules 100, 200. Prior to chip level dicing of the double bars 405, fiber optic testing equipment may be connected to the optical fiber endpoints 130 in order to test the yield of the opto-electric hybrid modules 100, 200. The fiber optic connector side 130 may typically be polished for example at an 8-degree angle. Pig-tail fibers may be attached at the end of the waveguide or waveguides 120. Completing the manufacturing of some embodiments of the present invention may include attaching the opto-electric components 110 such as for example photodiodes, laser diodes, or similar components to the opto-electric hybrid module 100, 200 (block 315). Active alignment beam may be needed to assure alignment of the opto-electric components 110 with the waveguides 120 embedded in the opto-electric hybrid module 100, 200. The opto-electric components 110 may typically be encapsulated with a thermal conductive polymer. The double bars may be diced to create separate opto-electric hybrid modules 100, 200.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A hybrid module comprising:
    an electro-optical component for transmitting or receiving energy;
    an electronic component for amplifying and transferring an electric signal to said electro-optical component;
    a planar light wave circuit formed of a glass layer for providing an opto-electronic signal communication path; and
    an optical waveguide embedded in and integrally formed with said glass layer forming said planar light wave circuit for propagating said opto-electronic signal communication,
    wherein the hybrid module is a glass-based packageless non-PCB module;
    wherein the optical waveguide is a glass-based mono-layer optical waveguide formed of a single layer of a single uncoated non-etched material;
    wherein a first edge of the optical waveguide, located in proximity to the electro-optical component, is tapered to improve the connection between the optical waveguide and the electro-optical component, and a second edge of the optical waveguide is non-tapered;
    wherein the hybrid module further comprises an optical fiber connector for direct connection to an external optical fiber, wherein the optical fiber connector is polished at an angle;
    wherein the electro-optical component and the electronic component are enclosed in a heat sink encapsulation to dissipate heat.

2. A hybrid module as in claim 1, further comprising an optical fiber plug connector.

3. A hybrid module as in claim 1, further comprising an embedded folding micro-mirror embedded in said planar light wave circuit for directing energy transfer between said electro-optical component and said optical waveguide.

4. A hybrid module as in claim 1, herein said heat sink encapsulation comprises a metal cap.

5. A hybrid module as in claim 1, wherein said electro-optical component is coupled to said electronic component.

6. A hybrid module as in claim 3, wherein said electro-optical component is coupled to said waveguide through said embedded folding micro-mirror.

7. A hybrid module as in claim 1, wherein said electro-optical component comprises a current amplifier for amplifying weak signals.

8. A method comprising:
    fabricating a waveguide glass wafer;
    producing a support glass wafer;
    creating optical chips by attaching said support glass wafer to said waveguide glass wafer;
    creating an electro-optical modules wafer by attaching electro-optical components to said waveguide glass wafer,
    wherein the created electro-optical modules wafer comprises at least one electro-optical module which is a glass-based packageless non-PCB module comprising:
    wherein the optical waveguide is a glass-based mono-layer optical waveguide formed of a single layer of a single uncoated non-etched material;
    wherein a first edge of the optical waveguide, located in proximity to the electro-optical component, is tapered to improve the connection between the optical waveguide and the electro-optical component, and a second edge of the optical waveguide is non-tapered;
    wherein the hybrid module further comprises an optical fiber connector for direct connection to an external optical fiber, wherein the optical fiber connector is polished at an angle
    wherein the electro-optical component and the electronic component are enclosed in a heat sink encapsulation to dissipate heat.

9. A method as in claim 8, wherein said fabricating said waveguide glass wafer further comprises:
    creating a plurality of waveguides using ion exchange technology in said waveguide glass wafer forming a planar lightwave circuit;
    printing electric lines and contacts on said waveguide glass wafer;
    dicing a slot in said waveguide glass wafer; and
    filling said slot in said waveguide glass wafer with a light-reflecting metal forming a micro-mirror.

10. A method as in claim 8, wherein said producing said support glass wafer further comprises:
    creating a plurality of vias on a glass substrate; coating said vias with a conductive material; and
    printing electrical lines and contacts on both sides of said support glass wafer.

11. A method as in claim 10, wherein said creating said plurality of vias comprises creating by wet or dry etching.

12. A method as in claim 9, wherein said creating said optical chip further comprises:
dicing said electro-optical modules wafer at one side to be connected to create double bars;
polishing said fiber optic connector side; and
attaching pig-tail fibers at an end of each of said plurality of waveguides.

13. A method as in claim 8, wherein said electro-optical components are attached to said optical chip using an active alignment beam.

14. A method as in claim 12, wherein said creating said electro-optical module further comprises:
encapsulating said electro-optical components and electronic components with a thermal conductive polymer; and
dicing said double bars to create said separate electro-optical modules.

15. A hybrid module as in claim 1, wherein said electro-optical component is mounted on said glass layer forming said planar light wave circuit.

16. A hybrid module as in claim 1, wherein said at least one optical waveguide is formed as a region of ion exchange within a waveguide glass wafer.

* * * * *